April 15, 1952     A. A. STUART, JR     2,593,070
METHOD OF COMPASS COMPENSATION
Filed Sept. 28, 1944
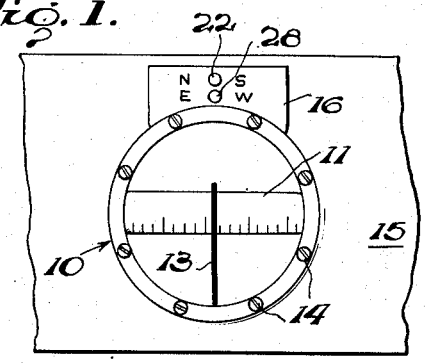
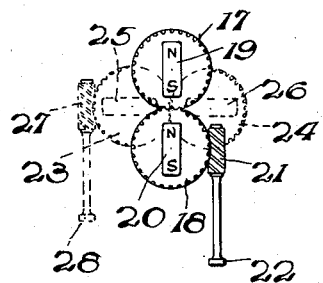
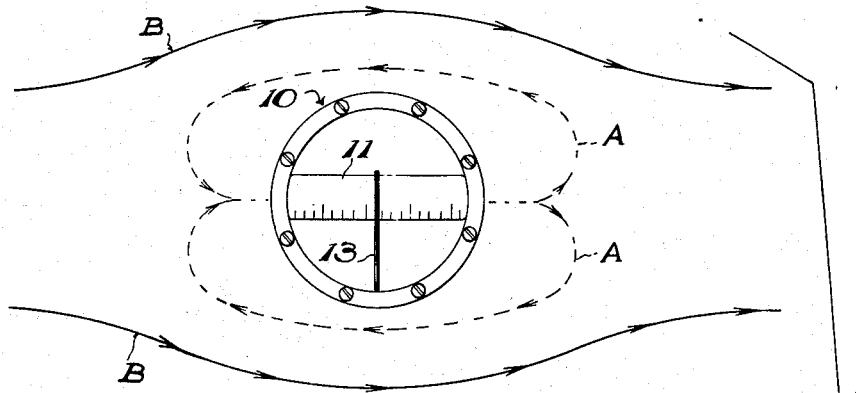
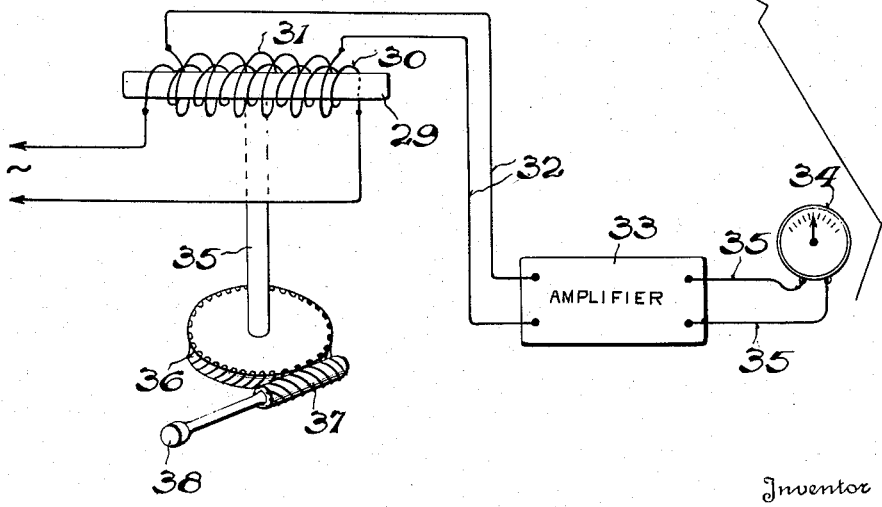
Inventor
Alfred A. Stuart, Jr.
By
Attorney Patented Apr. 15, 1952

2,593,070

UNITED STATES PATENT OFFICE 2,593,070

METHOD OF COMPASS COMPENSATION

Alfred A. Stuart, Jr., Hasbrouck Heights, N. J., assignor to Bendix Aviation Corporation, Teterboro, N. J., a corporation of Delaware Application September 28, 1944, Serial No. 556,201

10 Claims. (Cl. 73—1)

The present invention relates generally to magnetic compasses and more particularly to a novel method for compensating such compasses for semi-circular errors, i. e., those due to the sub-permanent magnetism of a craft carrying the compass.

In compensating for the effect produced by the ship's permanent magnetism upon the magnetic needle of a compass it has been the practice, heretofore, to swing the ship bodily throughout 360° and at definite intervals throughout the swing adjusting compensating N—S and E—W magnets, such as, for example, those shown in U. S. Patent No. 1,596,639, issued August 17, 1926. By adjusting the compensating magnets at the varying intervals the local fields of the magnets are so positioned that they are sufficient to cancel the effect of the ship's magnetism upon the magnetic needle thereby leaving it free to respond to the earth's magnetic field only. This procedure, however, is time consuming and in the end not entirely satisfactory for the reason that once an adjustment of the N—S magnets is made on a due North and/or South heading, for example, the correction afforded thereby is disturbed to a certain extent by a subsequent adjustment of the E—W magnets made on a due West and/or East heading, etc.

An object of the present invention, therefore, is to provide a novel method of compensating for the effect of sub-permanent magnetism of a ship upon a magnetic compass carried thereon whereby the foregoing disadvantages surrounding known methods have been overcome.

Another object of the invention is to provide a novel method of compensating a magnetic compass against the effect of the ship's sub-permanent magnetism without the necessity of swinging the ship throughout 360° as heretofore required.

A further object is to provide a novel method of compensating a magnetic compass against semi-circular error while the craft carrying the compass remains in the same heading throughout the operation.

The above and other objects and advantages of the invention will appear more fully hereinafter from a consideration of the detailed description which follows, taken together with the accompanying drawing which illustrates the elements required for carrying out the novel methods of compass compensation of the present invention. It is to be expressly understood, however, that the drawing is for the purpose of illustration and description only and is not designed as a definition of the limits of the invention.

In the drawings,

Figure 1 is a front plan view of a conventional compass installation together with its compensator on an indicating panel;

Figure 2 is a diagrammatic illustration of the arrangement of the magnets of the compensator; and, Figure 3 is an illustrative view of the compass and the inductor element for determining the zero field necessary for carrying out the novel compensating method of the present invention.

Although generically the same, the present invention contemplates two methods of compensating a magnetic compass against a ship's sub-permanent magnetism while the ship remains in the same heading throughout the operation. In both cases, the magnetic compass is removed from its compartment in the conventional indicating panel but the conventional compensating magnets are left in their normal position on the panel. In the one case, the position of a zero field is determined, i. e., that position either above or below the magnetic compass where the local field of the compass needle is equal and opposite to the earth's magnetic field. An inductor element is, thereafter, positioned in a N—S direction below the compass compartment at a point equivalent to the predetermined zero field and if the inductor output has a value other than a predetermined value for that heading one of the magnets is adjusted manually until the required value is indicated. The difference between the required value and the value before adjustment corresponds to the amount of the craft's magnetic field in the magnetic meridian which would normally influence the compass when the latter is in its compartment. Thereafter, the inductor is arranged athwartship in which position the output thereof should be zero but if it is not zero, the value corresponds to the amount of the craft's magnetic field in a thwartwise direction which would normally influence the compass when the latter is in its compartment and the other magnet is adjusted until the output is that desired whereupon the magnetic compass has been compensated against semi-circular error.

In the second case, the magnetic compass is removed from its compartment and the inductor rotatably mounted in the compartment and centered at the same point as the compass magnets ordinarily are. The ship is placed in the magnetic meridian and the compensating magnets are adjusted so that the longitudinal component measured by the inductor is the same as the earth's horizontal field and so that the thwartwise component is zero.

Any deviation in the value of the inductor in the magnetic meridian from the value of the earth's horizontal field and in the value of the inductor from zero in a thwartwise direction corresponds to the value of the craft's magnetic field in the magnetic meridian and in a thwartwise direction which would normally influence the compass when the latter is in its compartment.

Referring now to the drawing for a more detailed description of the subject matter of the present invention, a conventional magnetic compass 10 is illustrated in Figure 1 having a rose or card 11 and a fixed lubber line 13, the compass being mounted by means of screws 14 on an instrument panel 15 which supports a compensator casing 16 thereon directly above the compass.

The compensating magnets arranged within casing 16 may be of the type shown and described in the aforementioned U. S. patent and may be constructed as shown in Figure 2 wherein two meshing gears 17 and 18 support magnets 19 and 20 thereon, one of the gears meshing with a worm 21 having an actuating knob 22 therefor accessible from the exterior of the casing. Magnets 19—20 may be termed the N—S compensating magnets whose total magnetic field is of a maximum value when they are positioned in the manner shown in Figure 2 and is zero when the knob is actuated until the two magnets are parallel. Immediately below gears 17 and 18 are gears 23 and 24 which are in mesh and support magnets 25 and 26 thereon, a worm 27 engaging one of the latter gears by means of a second knob 28 likewise accessible from the front of casing 16. Normally, casing 16 is formed integrally with the casing of the compass so that the two define a single compact unit but for the purposes of the present invention the casing 16 is secured to the panel separately from the compass.

In compensating compass 10 against semi-circular error by the known methods, it was necessary to position the ship or craft in the magnetic meridian and if the compass reading indicated a position other than due north, knob 22 was actuated until the compass indicated true heading. The ship or craft was thereafter bodily moved to a due west position, for example, and if the compass failed to indicate due west, knob 28 was manipulated until the desired indication was obtained, this procedure being repeated for 360°.

By the novel method of the present invention, however, the bodily swinging of the ship or craft throughout 360° has been eliminated and compass compensation obtained by removing compass 10 from its panel compartment and transferring it away from the ship to a point where the magnetism of the ship will have no effect on the compass, i. e., the compass will respond to the earth's magnetic field only, and a zero field position is determined by the use of an inductor device.

The inductor device comprises as shown in Figure 3 of the drawing a magnetically permeable core 29 having a primary or energizing winding 30 thereon connected to a suitable source (not shown) of alternating or periodically varying current for periodically saturating and unsaturating the core. Also mounted on the core is a secondary or ouput winding 31 which connects by way of leads 32 with the input of a suitable amplifier 33, the output of which feeds into a meter 34 by way of leads 35. The operation of such inductor devices is well known and may be stated to consist of a periodic traversal of the core by the earth's magnetic field which enters and leaves the core twice per cycle of the energizing current in winding 30 whereupon E. M. F.'s are induced in the secondary having twice the frequency of the energizing current, the E. M. F.'s being amplified in amplifier 33 and registered by meter 34. Obviously, if no magnetic field threads the core, meter 34 will indicate zero.

In order to determine the zero magnetic field above mentioned, the inductor device is placed below the compass, the latter being now at some distance from the craft, and the device is moved downwardly relative to the compass until a point is reached where meter 34 reads zero. The position or distance of the zero field is that point where the local magnetic field of the compass needle, designated at A in Figure 3, is equal and opposite to the earth's field, designated at B. The distance between the compass and the inductor device, when the meter of the latter reads zero, is therefore the distance of the zero field from the compass. The compass is subsequently placed into its panel compartment and the inductor device, with its core 29 arranged in the magnetic meridian, is placed under the compass at the zero field previously determined. If the meter reading at this point is other than zero, the N—S magnets are actuated by knob 22 until the desired reading is indicated. The inductive device is subsequently arranged in the zero field wthi its core athwartship and if the meter reading is other than zero, knob 28 is actuated to position magnets 25 and 26 until the desired reading is obtained. During the foregoing operation it is necessary that the compass needle be maintained in the magnetic meridian and only mechanical forces should be employed to bring it there in case the needle is off due to a local magnetic attraction. The magnetic compass has thus been compensated against semi-circular error and this has been accomplished without the necessity for bodily swinging the ship as heretofore. This advantage is obviously of great importance where large aircraft, for example, are being considered.

The steps of removing the magnetic compass from the craft to a point remote therefrom and thereafter determining the zero field may be eliminated and the compass still compensated as desired for semi-circular error. To this end, therefore, the magnetic compass as before is removed from its panel compartment and the inductor device placed directly therein and centered for rotation at the same point as the compass needle ordinarily is. For rotation within the compartment, the core 29 may be mounted upon a shaft 35 provided with a gear 36 thereon adapted for engagement with a worm 37 actuable by a knob 38. Initially the craft is placed in the magnetic meridian and core 29 of the inductor device is arranged in the same meridian. The meter reading of the inductor should be the same as its reading when the device, arranged in the same manner some distance from the craft, is used to measure the earth's field. If the meter does not indicate the desired value, knob 22 is actuated until the required reading is obtained. Thereafter, the inductor device is rotated until core 29 is athwartship and since the core is normal to the earth's field the meter reading should be zero. If it is not, knob 28 is operated to bring about the desired condition. Thus, the N—S and E—W magnets have been so adjusted that the compass may be reinstated within its panel compartment, after the inductor device is removed therefrom, and be compensated against semi-circular error.

There have thus been provided novel methods of compensating magnetic compasses against semi-circular error having the principal advantage that the craft carrying the compass need not be swung bodily throughout 360° and this obviously is an important consideration when large aircraft, for example, are being considered.

I claim:

1. The method of compensating a magnetic compass against semi-circular error due to the craft's sub-permanent magnetism with the craft positioned in alignment with the magnetic meridian, comprising the steps of removing the compass from its panel compartment, measuring the effective magnetic field in the compartment in the magnetic meridian, adjusting a local magnetic field until the measured value is of a predetermined amount, and measuring the effective magnetic field in said compartment in a thwartwise plane and adjusting a second local magnetic field until the latter measured value is of a second predetermined amount.

2. The method of compensating a magnetic compass against semi-circular error due to the craft's sub-permanent magnetism with the craft positioned in alignment with the magnetic meridian, comprising the steps of removing the compass from its panel compartment, inductively measuring the effective magnetic field in the compartment in the magnetic meridian, adjusting a local magnetic field until the measured value is of a predetermined amount, and inductively measuring the effective magnetic field in said compartment in a thwartwise plane and adjusting a second local magnetic field until the latter measured value is of a second predetermined amount.

3. The method of compensating a magnetic compass against semi-circular error due to the craft's sub-permanent magnetism with the craft positioned in alignment with the magnetic meridian, comprising the steps of removing the compass from its panel compartment to a point external to said craft remote therefrom, determining at said point a zero field position for the compass, reinstating the compass within its compartment, measuring the magnetic field in the magnetic meridian at the zero field position of the compass, adjusting a local magnetic field until the measured value drops to zero, and measuring the magnetic field at said zero field position of the compass in a thwartwise direction and adjusting a second local magnetic field until the latter measured value drops to zero.

4. The method of compensating a magnetic compass against semi-circular error due to the craft's sub-permanent magnetism with the craft positioned in alignment with the magnetic meridian, comprising the steps of removing the compass from its panel compartment to a point external to said craft remote therefrom, determining at said point by induction a zero field position for the compass, reinstating the compass within its compartment, inductively measuring the magnetic field in the magnetic meridian at the zero field position of the compass, adjusting a local magnetic field until the measured value drops to zero, and inductively measuring the magnetic field at said zero field position of the compass in a thwartwise direction and adjusting a second local magnetic field until the latter measured value drops to zero.

5. The method of compensating a magnetic compass against semi-circular error due to the craft's sub-permanent magnetism with the craft positioned in alignment with the magnetic meridian, comprising the steps of determining a zero field position for the compass at a point free of the craft's sub-permanent magnetism, measuring the magnetic field in the magnetic meridian at the zero field position of the compass, adjusting a local magnetic field until the measured value drops to zero, and measuring the magnetic field at said zero field position of the compass in a thwartwise direction and adjusting a second local magnetic field until the latter measured value drops to zero.

6. The method of compensating a magnetic compass against semi-circular error due to the craft's sub-permanent magnetism with the craft positioned in alignment with the magnetic meridian, comprising the steps of determining a zero field position for the compass at a point free of the craft's sub-permanent magnetism, measuring by induction the magnetic field in the magnetic meridian at the zero field position of the compass, adjusting a local magnetic field until the measured value drops to zero, and measuring by induction the magnetic field at said zero position of the compass in a thwartwise direction and adjusting a second local magnetic field until the latter measured value drops to zero.

7. The method of compensating a magnetic compass against semi-circular error due to the craft's sub-permanent magnetism with the craft positioned in alignment with the magnetic meridian, comprising the steps of determining a zero field position for the compass by removing said compass to a point external and remote from said craft, measuring the magnetic field in the magnetic meridian at the zero field position of the compass, adjusting a local magnetic field until the measured value drops to zero, and measuring the magnetic field at said zero field position of the compass in a thwartwise direction and adjusting a second local magnetic field until the latter measured value drops to zero.

8. The method of compensating a magnetic compass, normally mounted in the panel compartment of a craft, against semi-circular error due to the craft's sub-permanent magnetism without the necessity of swinging the craft throughout 360°, comprising the steps of positioning the craft in alignment with the magnetic meridian, determining the amount of the craft's magnetic field in the magnetic meridian which would normally influence the compass when the latter is in its compartment, adjusting a local magnetic field until the influence of the craft's magnetic field on the compass in the magnetic meridian is eliminated, determining the amount of the craft's magnetic field in a thwartwise direction which would normally influence the compass when the latter is in its compartment, and adjusting a second local magnetic field until the influence of the craft's magnetic field on the compass in the thwartwise direction is eliminated.

9. The method of compensating a magnetic compass, normally mounted in the panel compartment of a craft, against semi-circular error due to the craft's sub-permanent magnetism without the necessity of swinging the craft throughout 360°, comprising the steps of positioning the craft in alignment with the magnetic meridian, determining inductively the amount of the craft's magnetic field in the magnetic meridian which would normally influence the compass when the latter is in its compartment, adjusting a local magnetic field until the influence of the craft's magnetic field on the compass in the magnetic meridian is eliminated, determining inductively the amount of the craft's magnetic field in a thwartwise direction which would normally influence the compass when the latter is in its compartment, and adjusting a second local magnetic field until the influence of the craft's magnetic field on the compass in the thwartwise direction is eliminated.

10. The method of compensating a magnetic compass, normally mounted in the panel compartment of a craft, against semi-circular error due to the craft's sub-permanent magnetism without the necessity of swinging the craft throughout 360°, comprising the steps of positioning the craft in alignment with the magnetic meridian, determining the amount of the craft's magnetic field in the magnetic meridian which would normally influence the compass when the latter is in its compartment and eliminating the influence of such field on the compass, and determining the amount of the craft's magnetic field in a thwartwise direction which would normally influence the compass when the latter is in its compartment and eliminating the influence of the latter field on the compass.

ALFRED A. STUART, Jr.

REFERENCES CITED

The following references are of record in the file of this patent:

UNITED STATES PATENTS

| Number | Name | Date |
|---|---|---|
| 210,066 | Thomson | Nov. 19, 1878 |
| 223,781 | Thomson | Sept. 28, 1880 |
| 1,596,639 | Vion | Aug. 17, 1926 |
| 1,819,797 | Shimizu | Aug. 18, 1931 |
| 2,053,154 | La Pierre | Sept. 1, 1936 |
| 2,213,357 | Barth | Sept. 3, 1940 |

OTHER REFERENCES

Burt et al., "Electric Circuits and the Magnetic Compass," Technical paper 44–7, Dec. 1943, American Institute of Electrical Engineers, 33 West 39th St., N. Y., N. Y. (4 pp.).